US012005797B2

(12) United States Patent
Heth et al.

(10) Patent No.: US 12,005,797 B2
(45) Date of Patent: Jun. 11, 2024

(54) THERMAL MANAGEMENT SYSTEM FOR AN ELECTRIC VEHICLE SUPPLY EQUIPMENT (EVSE) THAT INCLUDES A DUAL-SIDED HEATSINK

(71) Applicant: ChargePoint, Inc., Campbell, CA (US)

(72) Inventors: Jacob Heth, Lodi, CA (US); Jaana Behm, Cupertino, CA (US); William Rich, Emerald Hills, CA (US); Kevin Fetterman, San Jose, CA (US); Aaron Dayton Little, Campbell, CA (US); Stephen Eric Sidle, Morgan Hill, CA (US); Pasquale Romano, Los Gatos, CA (US)

(73) Assignee: CHARGEPOINT, INC., Campbell, CA (US)

( * ) Notice: Subject to any disclaimer, the term of this patent is extended or adjusted under 35 U.S.C. 154(b) by 0 days.

(21) Appl. No.: 18/455,959

(22) Filed: Aug. 25, 2023

(65) Prior Publication Data

US 2024/0067013 A1 Feb. 29, 2024

Related U.S. Application Data

(60) Provisional application No. 63/401,043, filed on Aug. 25, 2022.

(51) Int. Cl.
*B60L 53/302* (2019.01)
(52) U.S. Cl.
CPC ................... *B60L 53/302* (2019.02)
(58) Field of Classification Search
CPC .................................................. B60L 53/302

(Continued)

(56) References Cited

U.S. PATENT DOCUMENTS 5,035,281 A * 7/1991 Neuenfeldt ......... F28D 15/0266
165/104.34
5,583,418 A * 12/1996 Honda .................. B60L 53/305
320/109

(Continued)

FOREIGN PATENT DOCUMENTS

EP 2401186 B1 7/2019
JP 2014-067820 A 4/2014

OTHER PUBLICATIONS

International Search Report and Written Opinion, PCT App. No. PCT/US2023/072900, Dec. 14, 2023, 10 pages.

*Primary Examiner* — Jerry D Robbins
(74) *Attorney, Agent, or Firm* — NICHOLSON DE VOS WEBSTER & ELLIOTT LLP

(57) ABSTRACT

An electric vehicle supply equipment (EVSE) includes a thermal management system that includes a dual-sided heatsink that includes a first side that faces internal ambient air of the EVSE and a second side that faces external ambient air. A first fan circulates the internal ambient air of the EVSE across the first side to reject heat from the internal ambient air into the first side. A first airflow guide guides the internal ambient air across the first side of the dual-sided heatsink. A second fan draws external ambient air that flows across the second side to reject heat from the second side out of the thermal management system. A second airflow guide guides the external ambient air across the second side. An airflow seal prevents the external ambient air and the internal ambient air from mixing.

20 Claims, 19 Drawing Sheets

(58) Field of Classification Search
USPC .......................................................... 320/109
See application file for complete search history.

(56) References Cited

U.S. PATENT DOCUMENTS

| | | | | |
|---|---|---|---|---|
| 5,954,124 | A * | 9/1999 | Moribe | F28F 13/125 |
| | | | | 165/104.34 |
| 6,789,612 | B1 * | 9/2004 | Okamoto | H05K 7/206 |
| | | | | 165/104.34 |
| 7,108,052 | B2 * | 9/2006 | Giacoma | H05K 7/206 |
| | | | | 165/104.34 |
| 8,462,504 | B2 * | 6/2013 | Chen | H05K 7/20754 |
| | | | | 165/104.34 |
| 10,638,639 | B1 * | 4/2020 | Garner | F28D 15/0266 |
| 11,091,050 | B2 * | 8/2021 | Burgermeister | B60L 53/30 |
| 2004/0080912 | A1 | 4/2004 | Goth et al. | |
| 2005/0061485 | A1 * | 3/2005 | Hirafuji | F28D 15/0275 |
| | | | | 257/E23.103 |
| 2007/0169920 | A1 * | 7/2007 | Yang | H05K 7/206 |
| | | | | 165/104.34 |
| 2010/0218919 | A1 * | 9/2010 | Shibata | F24F 13/20 |
| | | | | 165/104.34 |
| 2012/0241135 | A1 * | 9/2012 | Takigawa | F28F 3/025 |
| | | | | 165/104.34 |
| 2013/0343110 | A1 * | 12/2013 | Liu | H05K 7/20909 |
| | | | | 363/141 |
| 2020/0369169 | A1 * | 11/2020 | Mercer | G06F 1/20 |
| 2021/0061113 | A1 * | 3/2021 | Ellis | B60L 53/20 |
| 2022/0115877 | A1 * | 4/2022 | Stanfield | B60L 53/16 |

* cited by examiner

THERMAL MANAGEMENT SYSTEM FOR AN ELECTRIC VEHICLE SUPPLY EQUIPMENT (EVSE) THAT INCLUDES A DUAL-SIDED HEATSINK

CROSS-REFERENCE TO RELATED APPLICATIONS

This application claims the benefit of U.S. Provisional Application No. 63/401,043, filed Aug. 25, 2022, which is hereby incorporated by reference.

FIELD

Embodiments of the invention relate to the field of electric vehicle charging; and more specifically, to a thermal management system for an electric vehicle supply equipment (EVSE) that includes a dual-sided heatsink.

BACKGROUND

Electric vehicle supply equipment (EVSE), which is sometimes referred to as an electric vehicle charging station, can experience high internal temperatures when charging an electric vehicle. These high temperatures can damage the components of the EVSE and otherwise degrade charging performance.

Many EVSEs rely on fresh air intake into the EVSE for thermal management. However, the fresh air can compromise the Ingress Protection (IP) and Pollution Degree (PD) rating that grades the resistance of the EVSE against the intrusion of dust or liquids. This leads to a reduction in long term reliability of the EVSE and/or requires air filters that require frequent maintenance.

SUMMARY

An electric vehicle supply equipment (EVSE) includes a thermal management system that includes a dual-sided heatsink that includes a first side that faces internal ambient air of the EVSE and a second side that faces external ambient air. A first fan circulates the internal ambient air of the EVSE across the first side to reject heat from the internal ambient air into the first side. A first airflow guide guides the internal ambient air across the first side of the dual-sided heatsink. A second fan draws external ambient air that flows across the second side to reject heat from the second side out of the thermal management system. A second airflow guide guides the external ambient air across the second side. An airflow seal prevents the external ambient air and the internal ambient air from mixing.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

A thermal management system for an electric vehicle supply equipment (EVSE) that includes a dual-sided heatsink is described. The dual-sided heatsink includes a first side that faces internal ambient air of a sealed enclosure of the EVSE that includes heat generating electrical components, and a second side that faces external ambient air. The first side and the second side of the dual-sided heatsink may have a finned structure. The thermal management system further includes a first fan that circulates the internal ambient air of the sealed enclosure of the EVSE across a length of the first side of the dual-sided heatsink to reject heat from the internal ambient air into the dual-sided heatsink. An internal airflow guide, which may be a backplate to which the first fan may be mounted, guides the internal ambient air across the length of the first side of the dual-sided heatsink. The thermal management system further includes a second fan that draws external ambient air that flows across a length of the second side of the dual-sided heatsink to reject heat from the dual-sided heatsink out of the EVSE into the environment. An external airflow guide, which may be a cover that covers the first side of the dual-sided heatsink. guides the external ambient air across the length of the second side of the dual-sided heatsink. The thermal management system further includes an airflow seal that prevents the external ambient air and the internal ambient air from mixing. In an embodiment, no electronic components of the EVSE are directly connected to the dual-sided heatsink.

The heat from the internal ambient air conducts to the internal facing side of the dual-sided heatsink, the heat from the internal facing side of the dual-sided heatsink conducts to the external facing side of the dual-sided heatsink, and the heat from the external facing side of the dual-sided heatsink conducts to the external ambient air, that is rejected from the EVSE. Thus, the heat rejected into the internal ambient air of the EVSE is rejected from the EVSE through the dual-sided heatsink.

The airflow seal that prevents the external ambient air and the internal ambient air from mixing ensures a low pollution degree (PD) and no need for dust filtration. The thermal management system described herein has greater thermal performance than a single sided free convection heatsink, while avoiding the pollution degree and filtration issues encountered with fresh air intake. Fresh air intake with a filtration system might require scheduled maintenance annually, whereas the thermal management system described herein can go many years without scheduled maintenance. The lower pollution degree decreases the requirements for creepage and clearance between electrical components which can reduce the size and cost of PCBAs.

Figure 1:
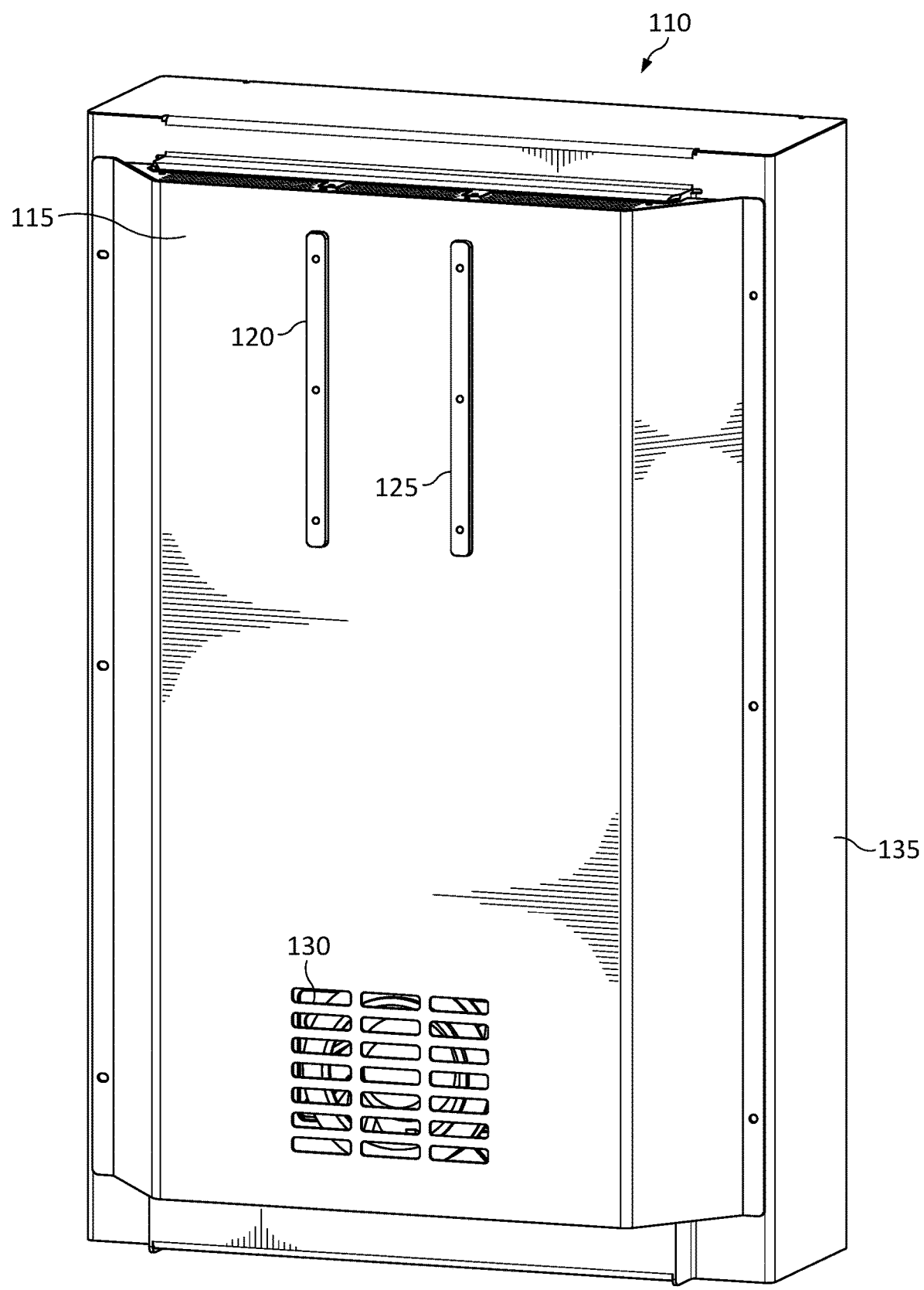
FIG. 1 shows one side of an EVSE that includes a thermal management system that includes a dual-sided heatsink according to an embodiment.
Figure 2:
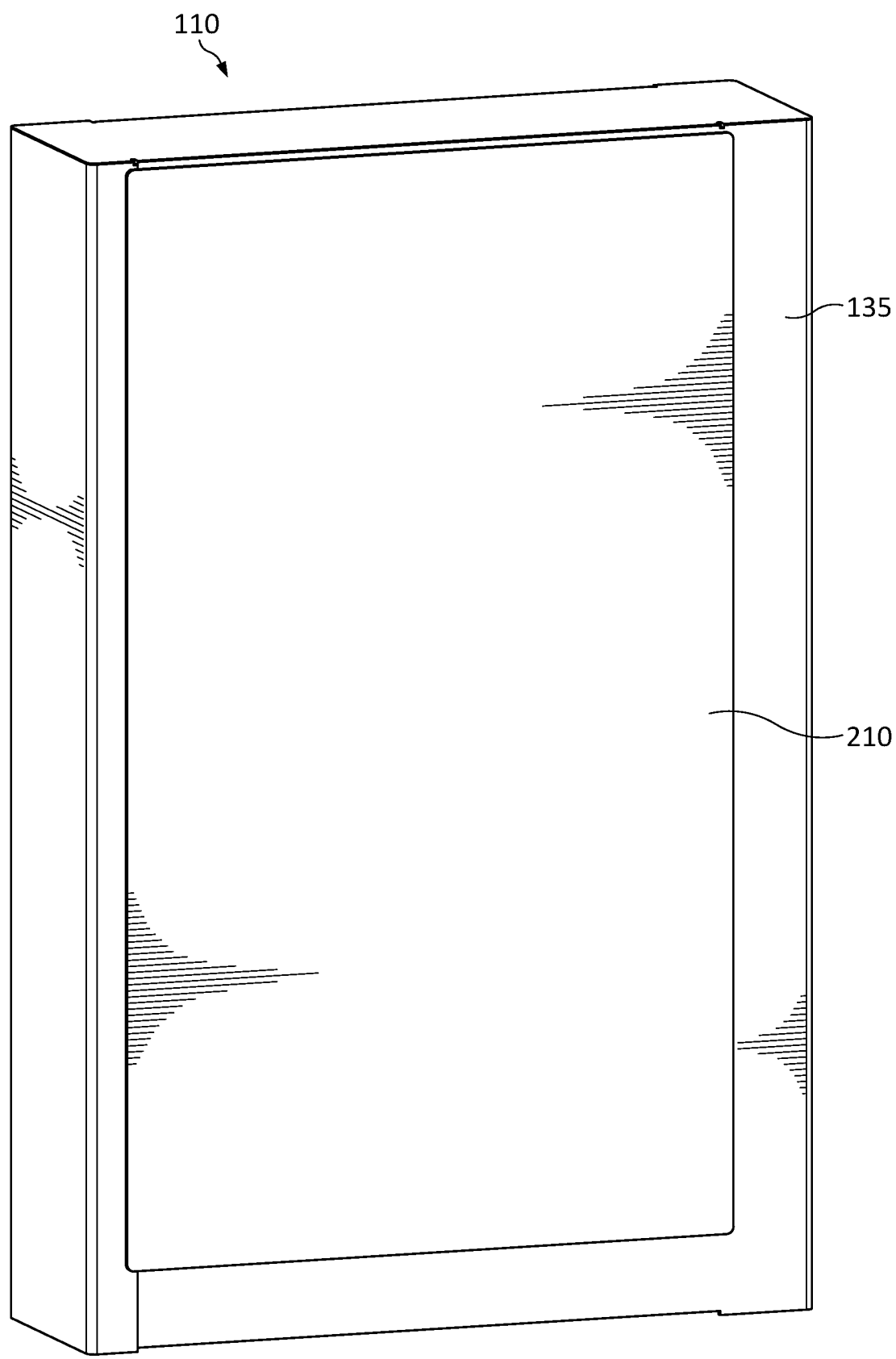
FIG. 2 shows another side of the EVSE that includes a thermal management system of FIG. 1 that is generally the front of the EVSE according to an embodiment.
Figure 3:
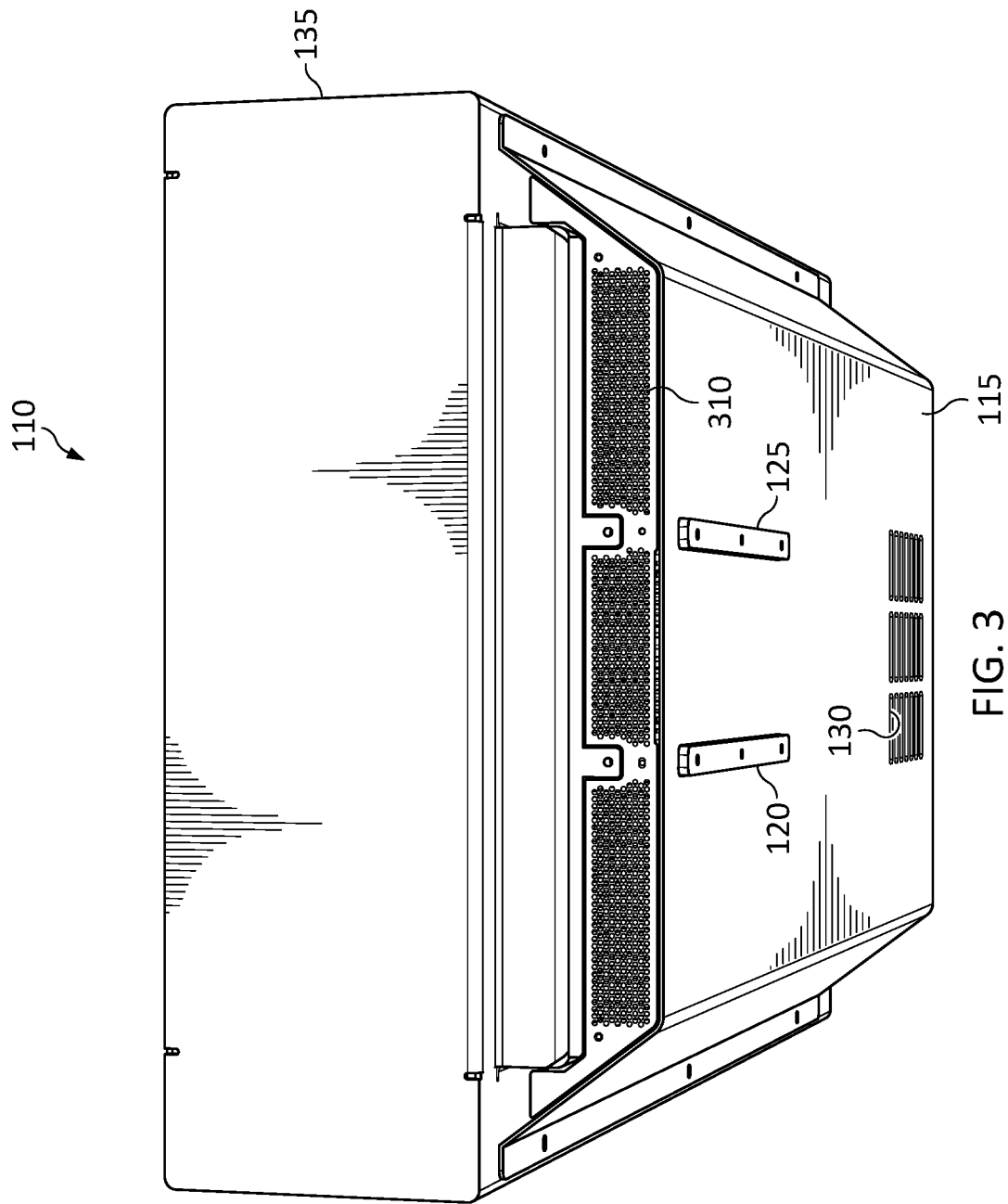
FIG. 3 is another view of the EVSE that includes a thermal management system of FIG. 1 that shows a perspective view of the top of the system and the external side of the system according to an embodiment.
Figure 4:
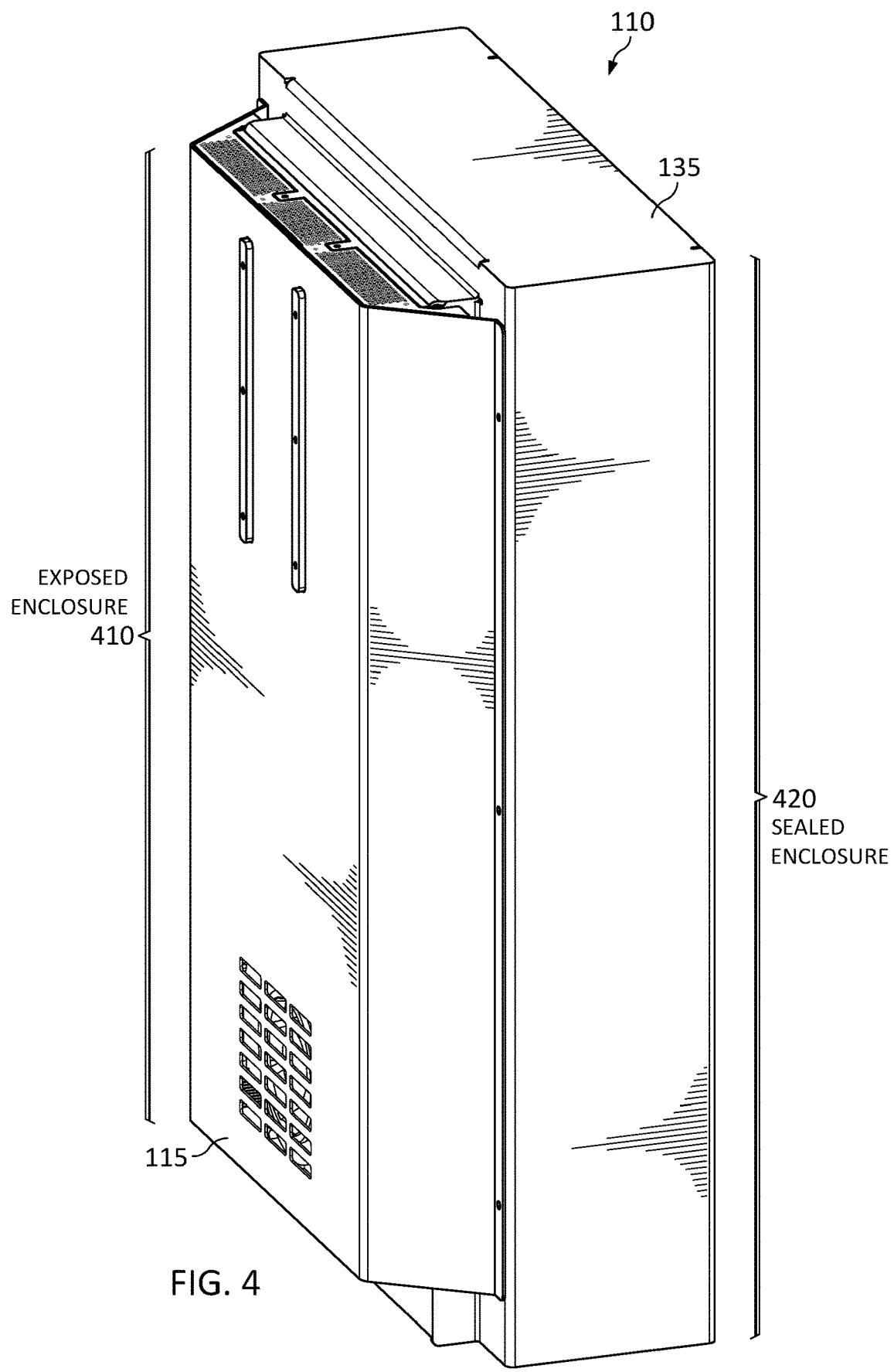
FIG. 4 is another view of the EVSE that shows a side view of the system of FIG. 1 according to an embodiment.
Figure 5:
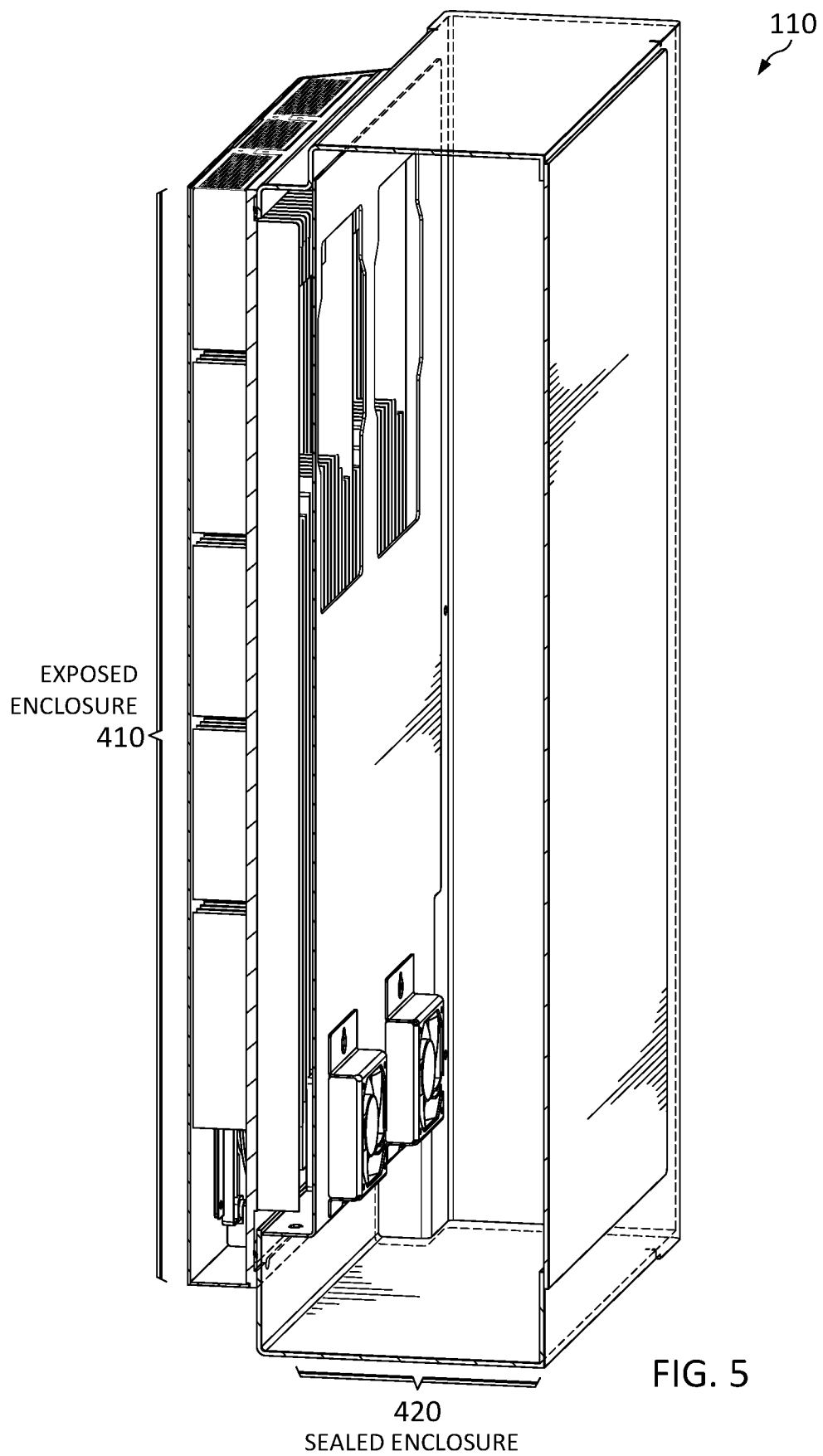
FIG. 5 is another view of the EVSE that shows a side view of the system of FIG. 1 where the external facing cover and EVSE frame are transparent according to an embodiment.

FIG. 1 shows one side of an EVSE that includes a thermal management system 110 that includes a dual-sided heatsink according to an embodiment. The view shown in FIG. 1 is generally the back of the EVSE. FIG. 2 shows another side of the EVSE that includes a thermal management system that is generally the front of the EVSE according to an embodiment. FIG. 3 is another view of the EVSE that includes a thermal management system that shows a perspective view of the top of the system and the external side of the system. FIG. 4 is another view of the EVSE that shows a side view of the system. FIG. 5 is another view of the EVSE that shows a side view of the system where the external facing cover and EVSE frame are transparent.

The exterior aspects of the thermal management system 110 include the external facing cover 115, the attachment ribs 120 and 125 (which are optional in an embodiment), the finger guard 130, the EVSE frame 135, the frame cover 210, and the top cover 310. The thermal management system includes an exposed enclosure 410 and a sealed enclosure 420. The sealed enclosure 420 (partially sealed by the frame cover 210) is where the electrical components of the EVSE are located and internal ambient air is circulated. The internal ambient air within the sealed enclosure 420 is heated by electronic components of the EVSE. Forced airflow within the sealed enclosure 420 across these heat generating electronic components reject the heat of the internal ambient air into the dual-sided heatsink. The exposed enclosure 410 allows external ambient air to be drawn in and allows heat from the dual-sided heatsink to be rejected into the environment. A first cooling loop exists within the exposed enclosure 410 (sometimes called herein an external cooling loop) and a second cooling loop exists within the sealed enclosure 420 (sometimes called herein an internal cooling loop).

The dual-sided heatsink straddles the sealed enclosure 420 and the exposed enclosure 410. For instance, one side of the dual-sided heatsink is internal facing and part of the sealed enclosure 420 and the internal cooling loop, and the other side of the dual-sided heatsink is external facing and part of the exposed enclosure 410 and the external cooling loop. Air or other material does not mix between the exposed enclosure 410 and the sealed enclosure 420. For instance, air does not mix between the internal cooling loop and the external cooling loop.

The external facing cover 115 covers the external facing side of the dual-sided heatsink (part of the exposed enclosure 410) and acts as an airflow guide for the external cooling loop. External ambient air enters through the finger guard 130 (which includes slots for external ambient air intake) and the external facing cover 115 guides airflow across the length of the heatsink and exit through the top cover 310 (which will be described in greater detail with respect to later figures). The attachment ribs 120 and 125 allow for the EVSE to be attached to a mount or allow a cable management solution to be attached to the EVSE The top cover 310 is a hole mesh pattern that allows the external ambient air to escape out the top of the thermal management system while preventing large debris from entering. Rain and other debris smaller than the holes (e.g., dust) may enter the external facing side of the dual-sided heatsink. However, the force of the external ambient air exiting the top cover 310 can dislodge and/or prevent at least some of the debris such as dust from entering the external facing side of the dual-sided heatsink. Rain and dust are prevented from reaching the internal side of the EVSE (e.g., prevented from getting within the sealed enclosure 420).

Figure 6:
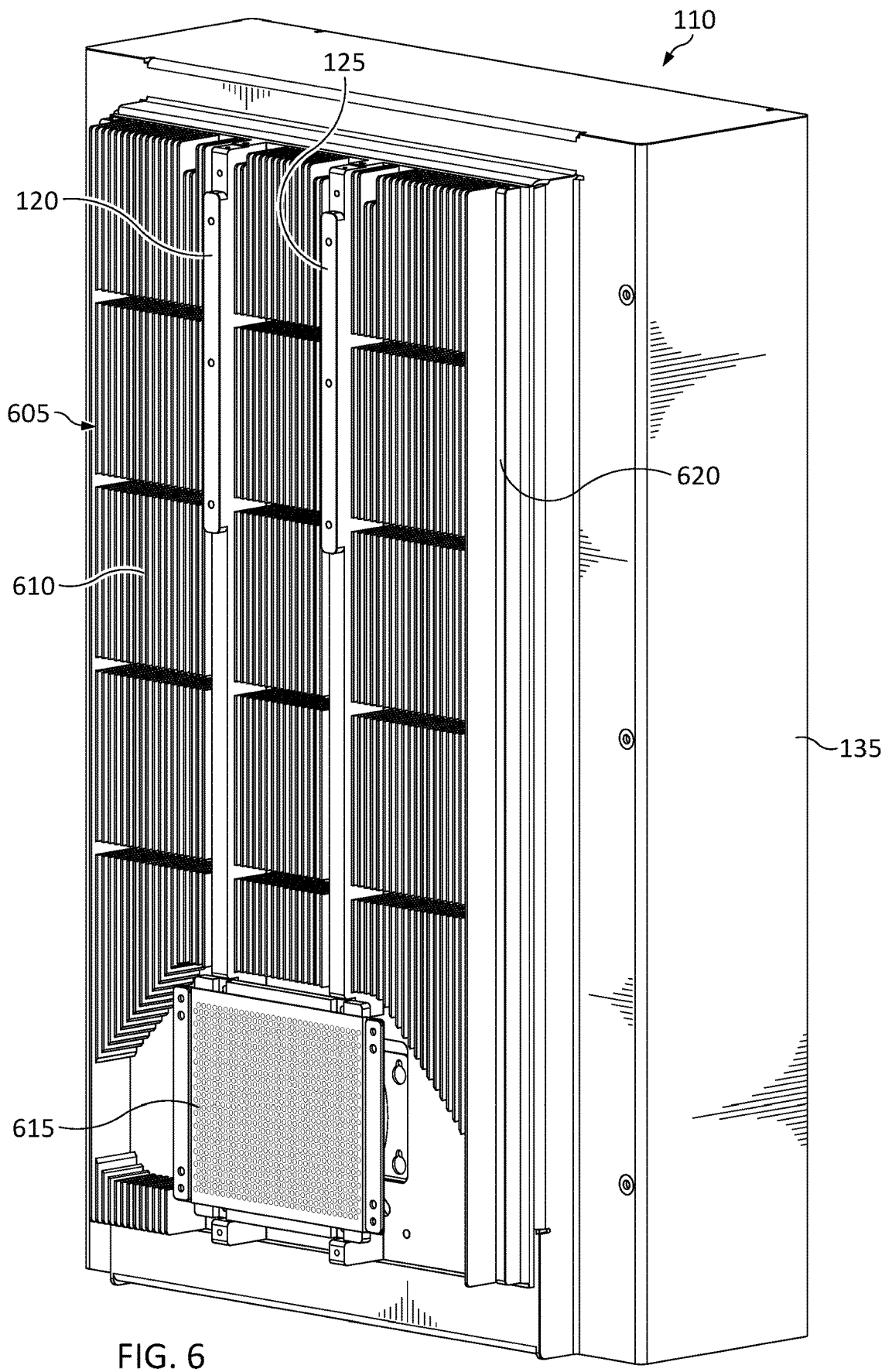
FIG. 6 shows the side of the thermal management system of FIG. 1 where the external facing cover and top cover have been removed according to an embodiment.
Figure 7:
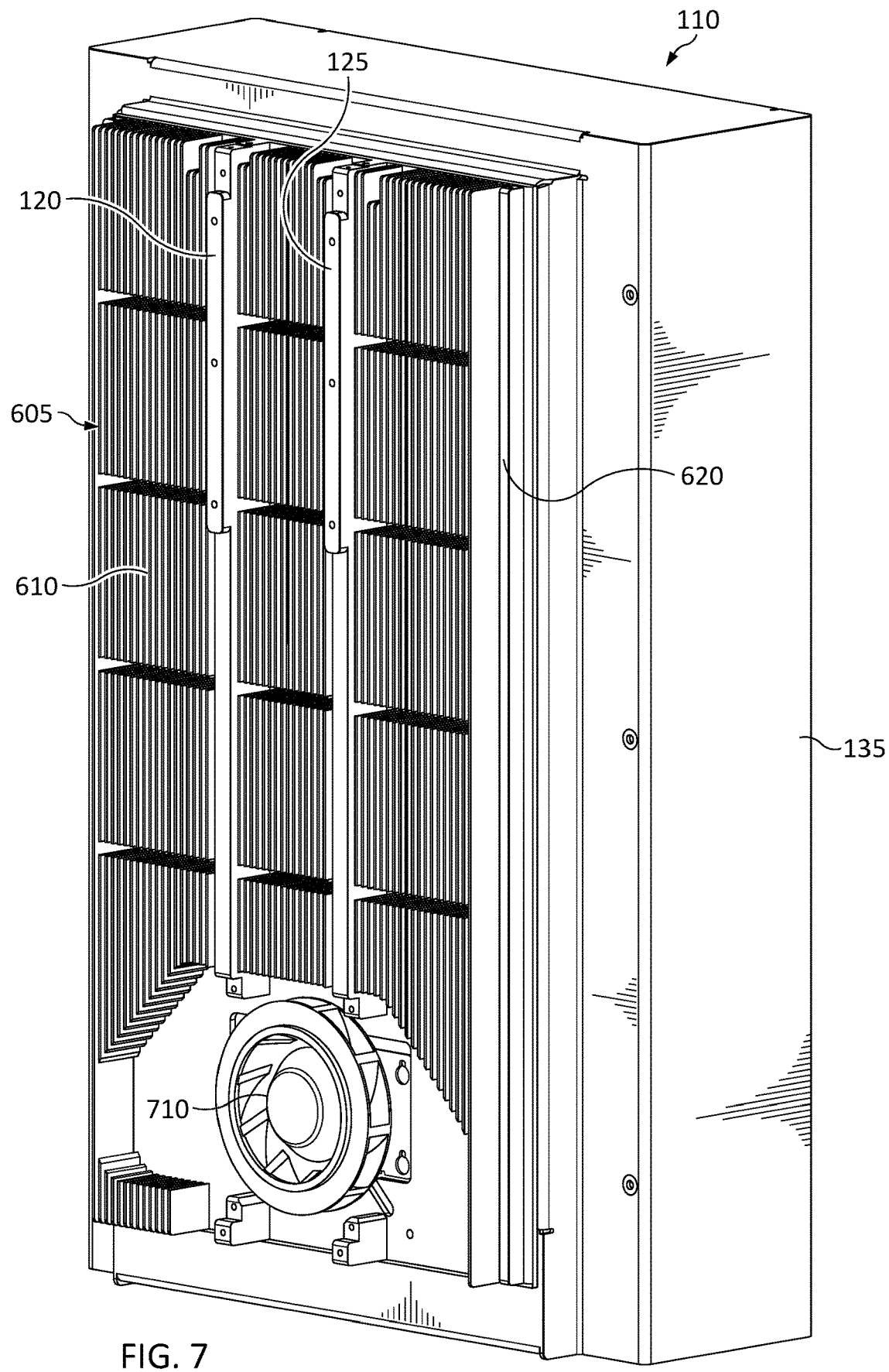
FIG. 7 shows the view of FIG. 6 with the fan duct being removed according to an embodiment.
Figure 8:
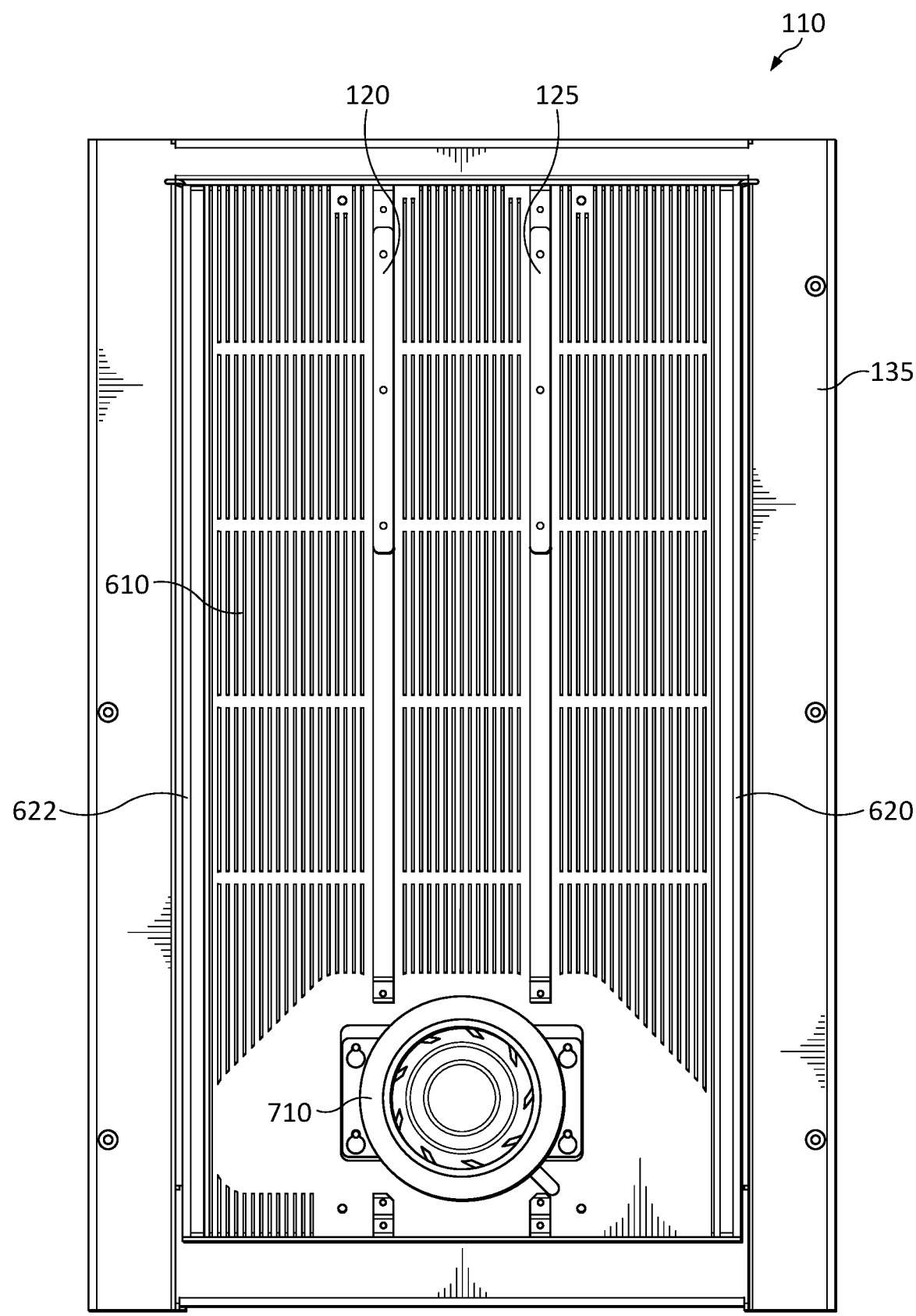
FIG. 8 shows a back view of the thermal management system of FIG. 7 according to an embodiment.

FIG. 6 shows the side of the thermal management system of FIG. 1 where the external facing cover 115 and top cover 310 has been removed. FIG. 7 shows the same with the fan duct 615 being removed. FIG. 8 shows a back view of the thermal management system of FIG. 7 according to an embodiment.

A first side 610 of the dual-sided heatsink 605 faces the external ambient air and is sometimes referred herein as the external side. Later figures show a second side of the dual-sided heatsink 605 that faces the internal ambient air of the sealed enclosure of the EVSE that is sometimes referred to herein as the internal side. The first side 610 is part of the exposed enclosure 410 and external cooling loop, and the internal side is part of the sealed enclosure 420 and internal cooling loop.

The dual-sided heatsink is a finned structure that mounts to the EVSE frame 135 where the first side 610 faces external ambient air and the internal side faces internal ambient air. Outer attachment ribs are used to mount the dual-sided heatsink to the EVSE frame 135 such as the outer attachment ribs 620 and 622. The dual-sided heatsink may be made from aluminum or other suitable material. The finned structure of the first side 610 of the dual-sided heatsink 605 is shown in a grid pattern. The rectangular cutouts on the external side that create the grid pattern are used to help even out airflow between individual fins. The grid pattern is optional and different types of patterns can be used (e.g., the external side of the dual-sided heatsink may not be in a grid). In an embodiment, the spacing between the fins is less than or equal to 5 mm. However, different fin sizes and spacing can be used.

Figure 9:
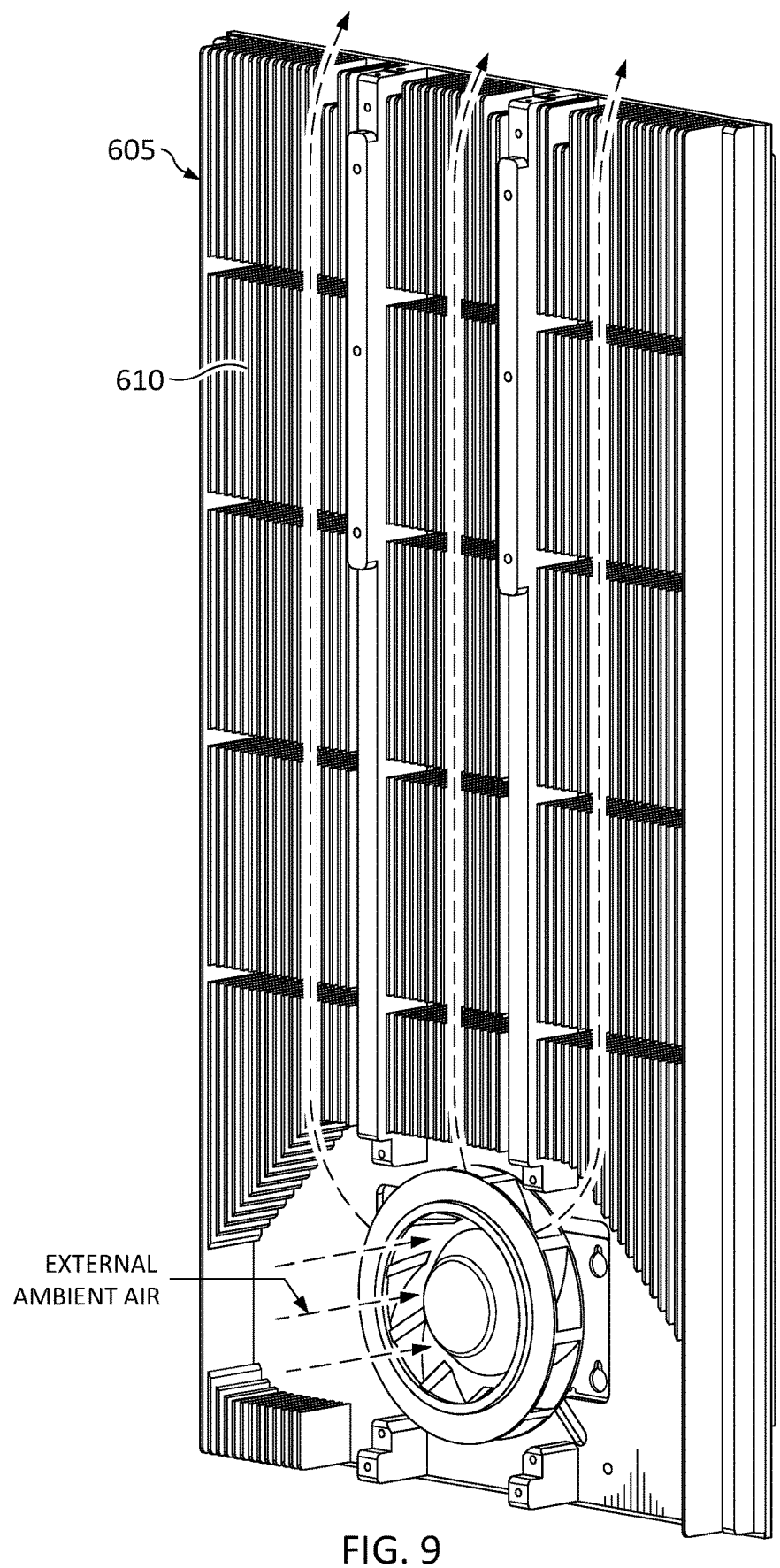
FIG. 9 shows an example of the airflow of the external ambient air according to an embodiment.
Figure 10:
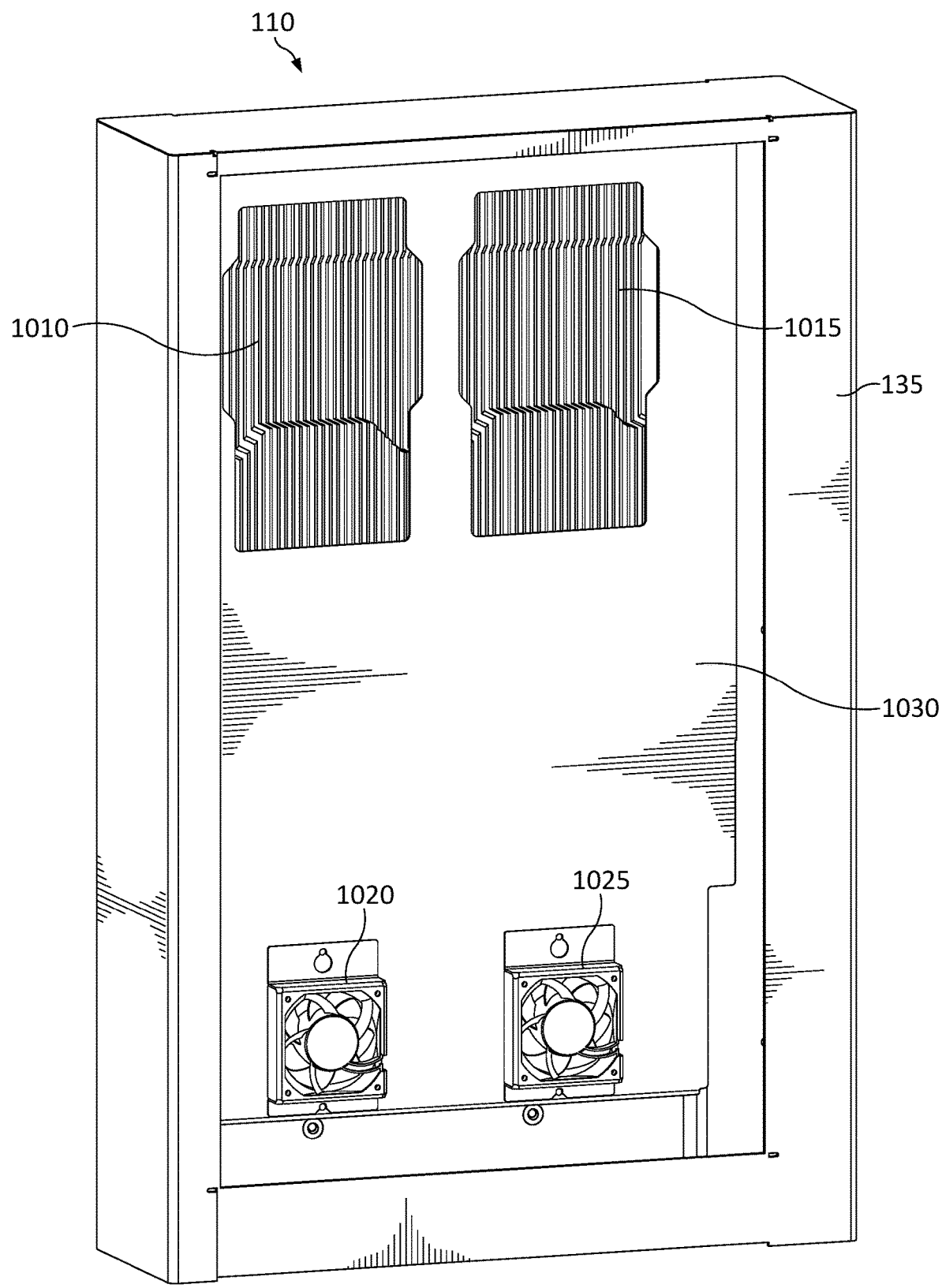
FIG. 10 shows a view of the thermal management system of FIG. 2 where the frame cover has been removed to show internal components of the thermal management system on the internal side of the dual-sided heatsink according to an embodiment.
Figure 11:
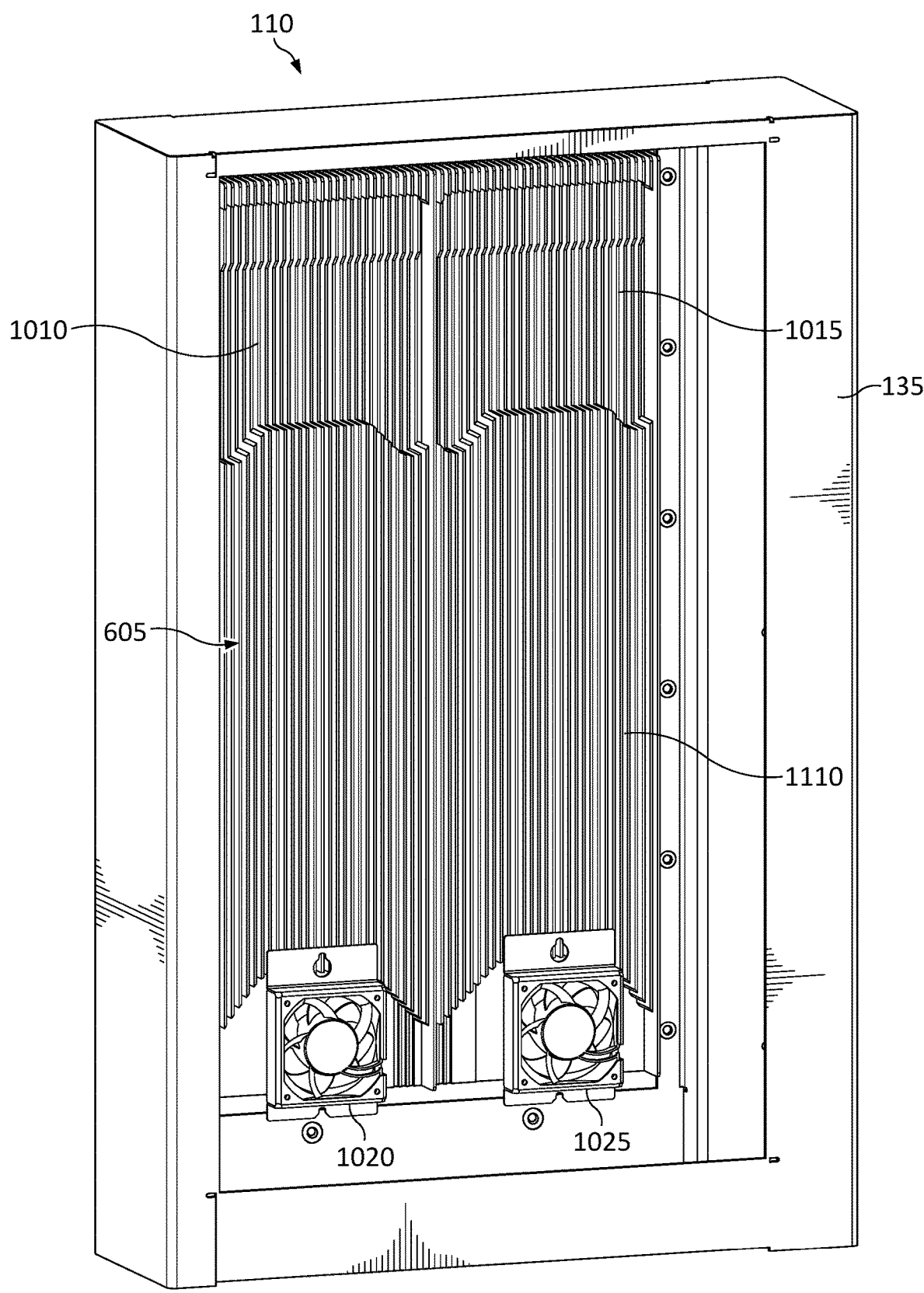
FIG. 11 shows the same side of the thermal management system of FIG. 10 where the internal backplate has been removed according to an embodiment.
Figure 12:
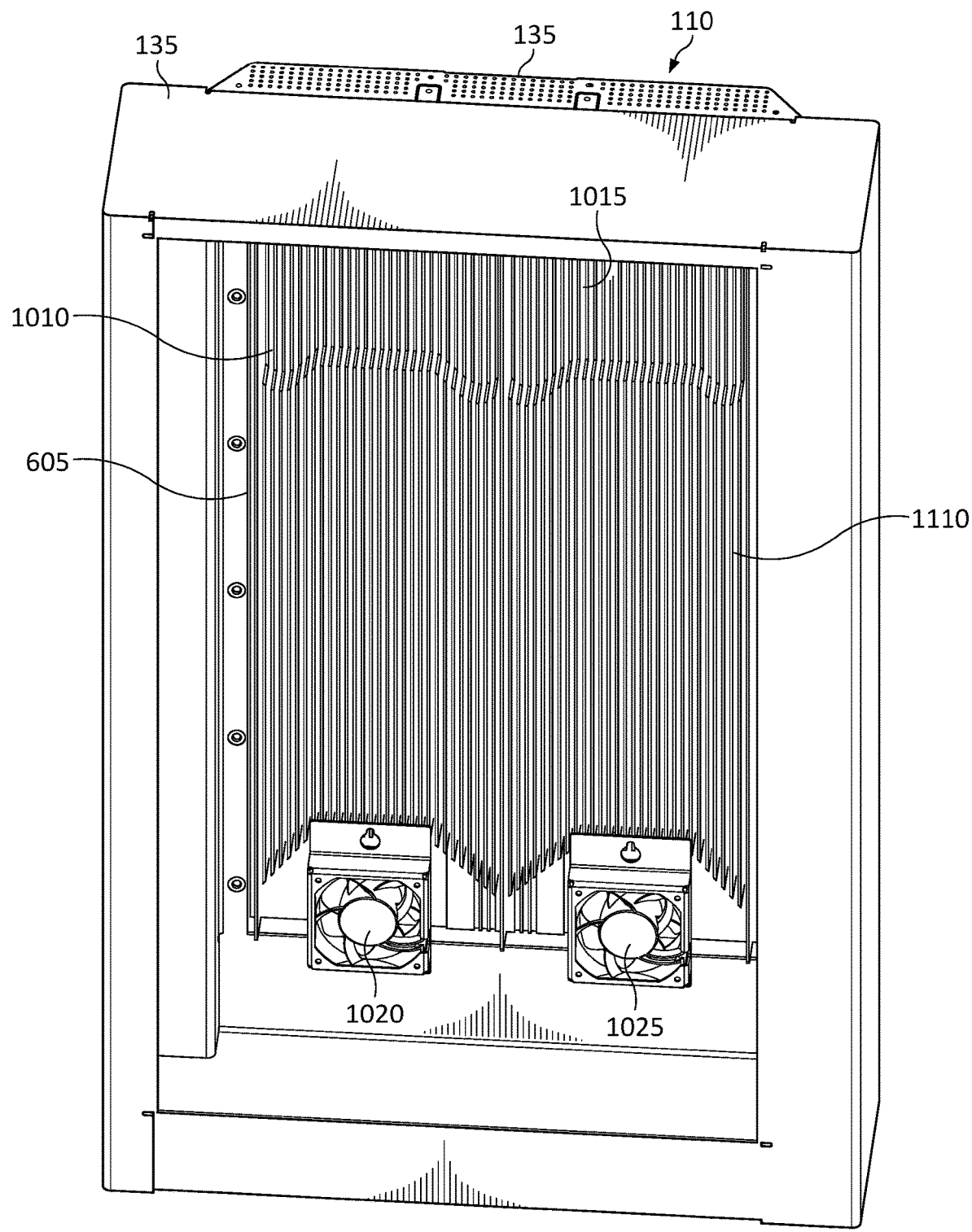
FIG. 12 is another view of the thermal management system that shows a perspective view of the top of the system.
Figure 13:
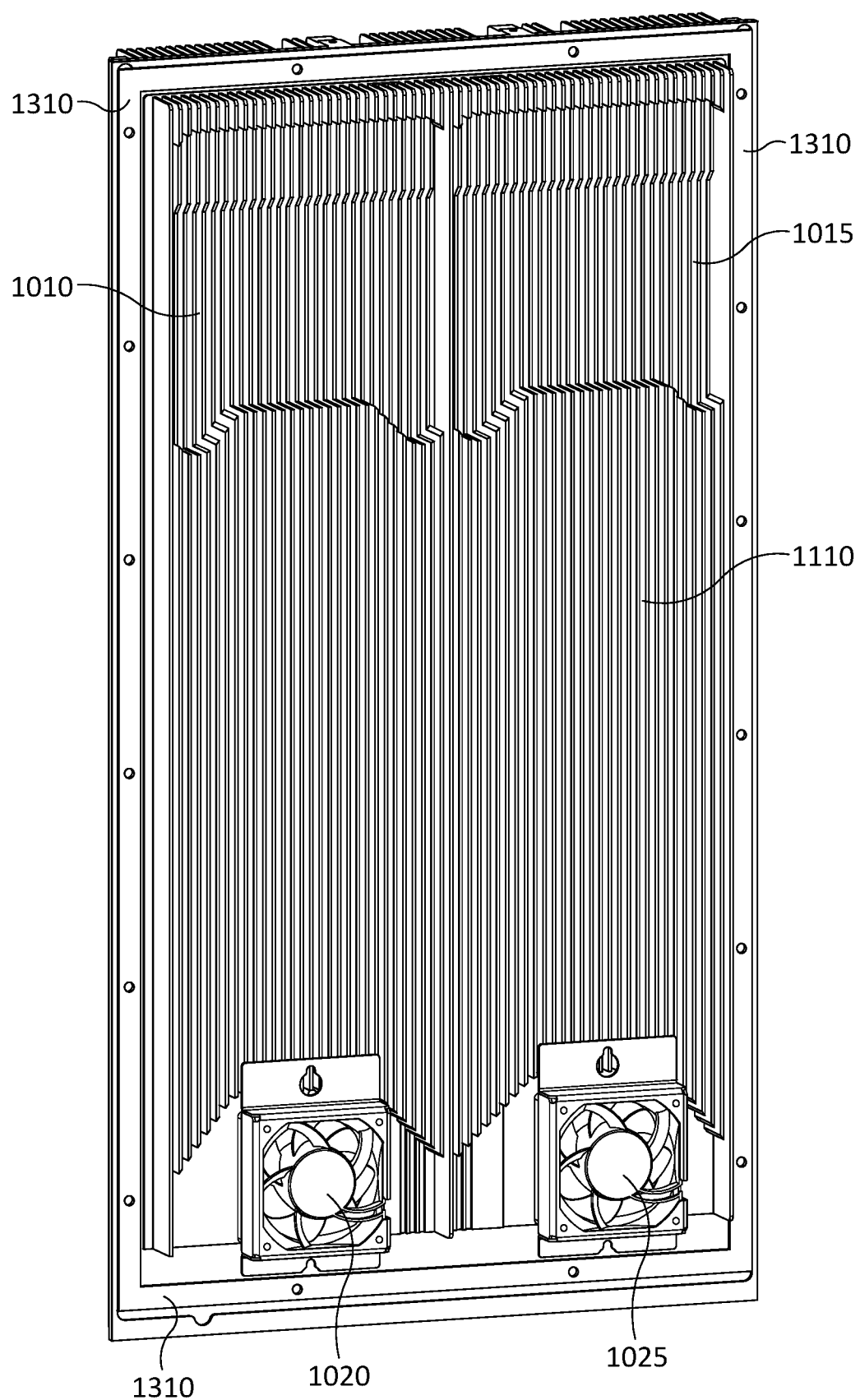
FIG. 13 shows the internal side of the dual-sided heatsink and the internal fans according to an embodiment.

The external fan 710 draws external ambient air and forces the air across the length of the first side 610 of the dual-sided heatsink 605 to pull away heat and exit out the top cover 310. Thus, the external fan 710 generates forced convection on the first side 610 of the dual-sided heatsink 605. This is shown in the example of FIG. 9. The term external with respect to the external fan 710 refers to the fan drawing ambient air that is external to the EVSE. The external fan 710 is within the EVSE according to an embodiment (e.g., within the exposed enclosure 410 of the thermal management system 110). As shown in FIG. 7 and other figures, the external fan 710 is a centrifugal fan in an embodiment. However, other types of fans may be used such as axial fans. While the external fan is shown as being toward the bottom of the external side of the dual-sided heatsink (e.g., located proximate to the bottom third of the dual-sided heatsink), the external fan 710 may be in a different position. Further, while one external fan is shown, in another embodiment there may be multiple external fans that draw external ambient air and force the air across the external side of the dual-sided heatsink. A fan duct 615 ensures an optimal air intake path for the external fan 710. FIG. 10 shows a view of the thermal management system of FIG. 2 where the frame cover 210 has been removed to show internal components of the thermal management system on the internal side of the dual-sided heatsink 605. FIG. 11 shows the same side of the thermal management system where the internal backplate 1030 has been removed. FIG. 12 is another view of the thermal management system that shows a perspective view of the top of the system. FIG. 13 shows the internal side of the dual-sided heatsink and the internal fans. Although not shown in these Figures to not obscure understanding of embodiments, the EVSE has internal electrical components within the sealed enclosure 420 that are common for EVSEs, such as contactors or relays, metering, safety features, processors, etc. These internal electronic components are isolated from the frame of the EVSE. Further, in an embodiment, these electronic components are not directly connected to the dual-sided heatsink 605.

Figure 14:
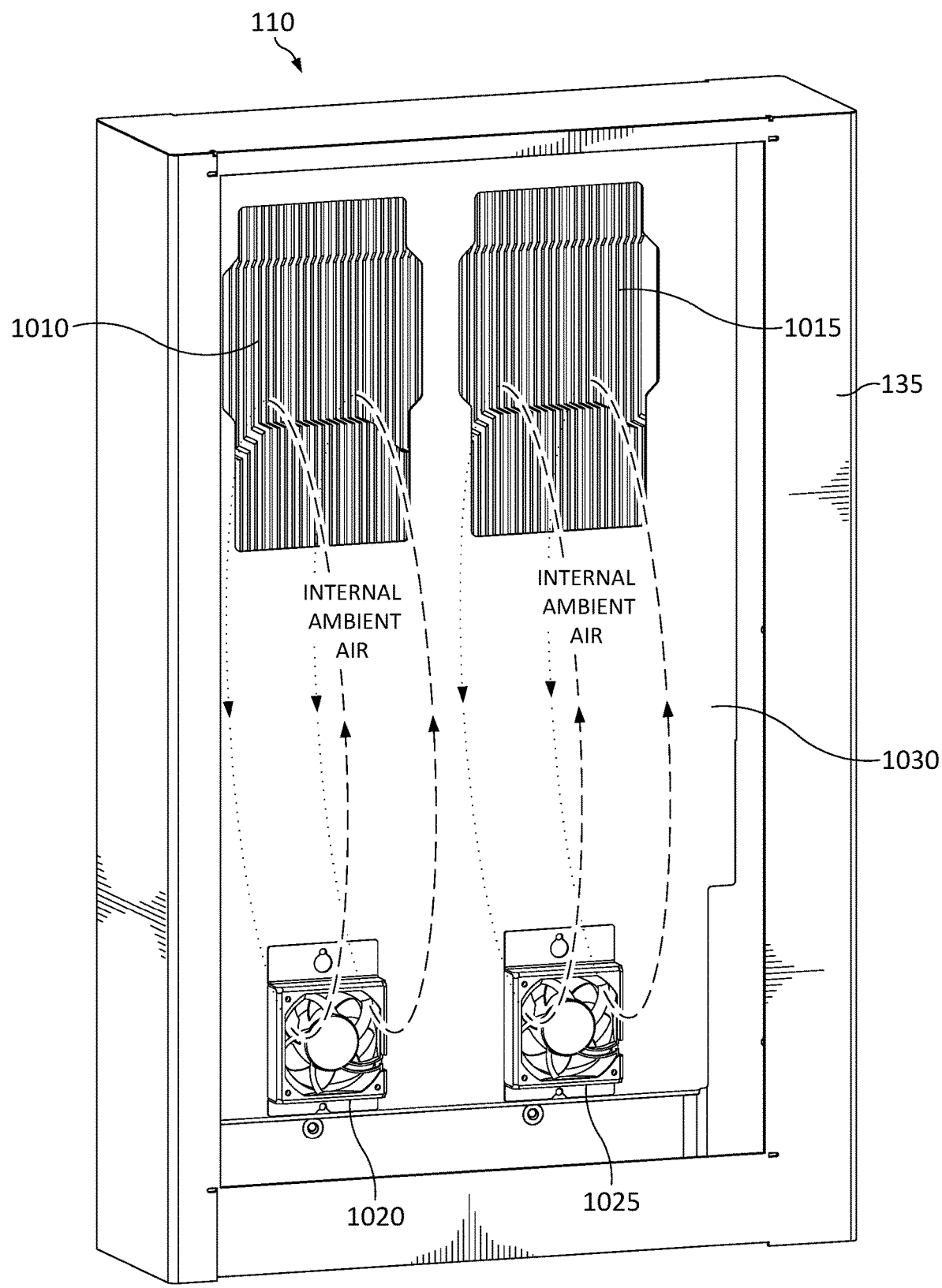
FIG. 14 shows an example of airflow of the internal ambient air according to an embodiment.

The internal backplate 1030 is the mounting pout for the internal fans 1020 and 1025 and is an airflow guide for the internal side of the dual-sided heatsink 605. The internal fans 1020 and 1025 internally circulate internal ambient air and force it across the length of the second side 1110 of the dual-sided heatsink 605, which is sometimes referred herein as the internal side. This is shown in the example of FIG. 14 where the dotted lines indicate airflow within the gap between the internal backplate 1030 and the second side 1110 of the dual-sided heatsink 605 and the dashed lines indicate airflow on the other side of the internal backplate 1030. In an embodiment, the internal fans 1020 and 1025 are axial fans. However, the internal fans 1020 and/or 1025 may be a different type of fan (e.g., centrifugal fans). Although the internal fans 1020 and 1025 are shown as being toward the bottom of the internal side of the dual-sided heatsink (e.g., located proximate to the bottom third of the dual-sided heatsink), the internal fans 1020 and 1025 may be in a different position. Further, while two internal fans are shown, in another embodiment there may be a single internal fan or more than two internal fans that circulate internal ambient air.

The finned structure of the second side 1110 of the dual-sided heatsink 605 is shown as mostly a solid pattern with cutouts 1010 and 1015. The cutouts 1010 and 1015 allow the highest heat generating components inside the internal side of the frame of the EVSE to be placed near the surface of the second side 1110 of the dual-sided heatsink 605 without being physically touching. Keeping these components close to the heatsink helps minimize the internal ambient air temperature inside the EVSE. Further, the cutouts 1010 and 1015 allow for a thinner overall design of the EVSE. The number of cutouts is exemplary and shown as two for two sets of contactors. If the EVSE was designed with a single set of contactors, there may be only a single cutout. However, the fin pattern shown in FIG. 11 is optional and different types of patterns can be used (e.g., a grid pattern like that shown in FIG. 6 could be used).

The thermal management system includes the airflow seal 1310 that covers the perimeter of the second side 1110 of the dual-sided heatsink 605 and seals the interface between the second side 1110 of the dual-sided heatsink 605 and the EVSE frame 135. The airflow seal 1310 prevents the external ambient air and the internal ambient air from mixing. The airflow seal 1310 may be a compressible material such as a silicon foam.

Figure 15:
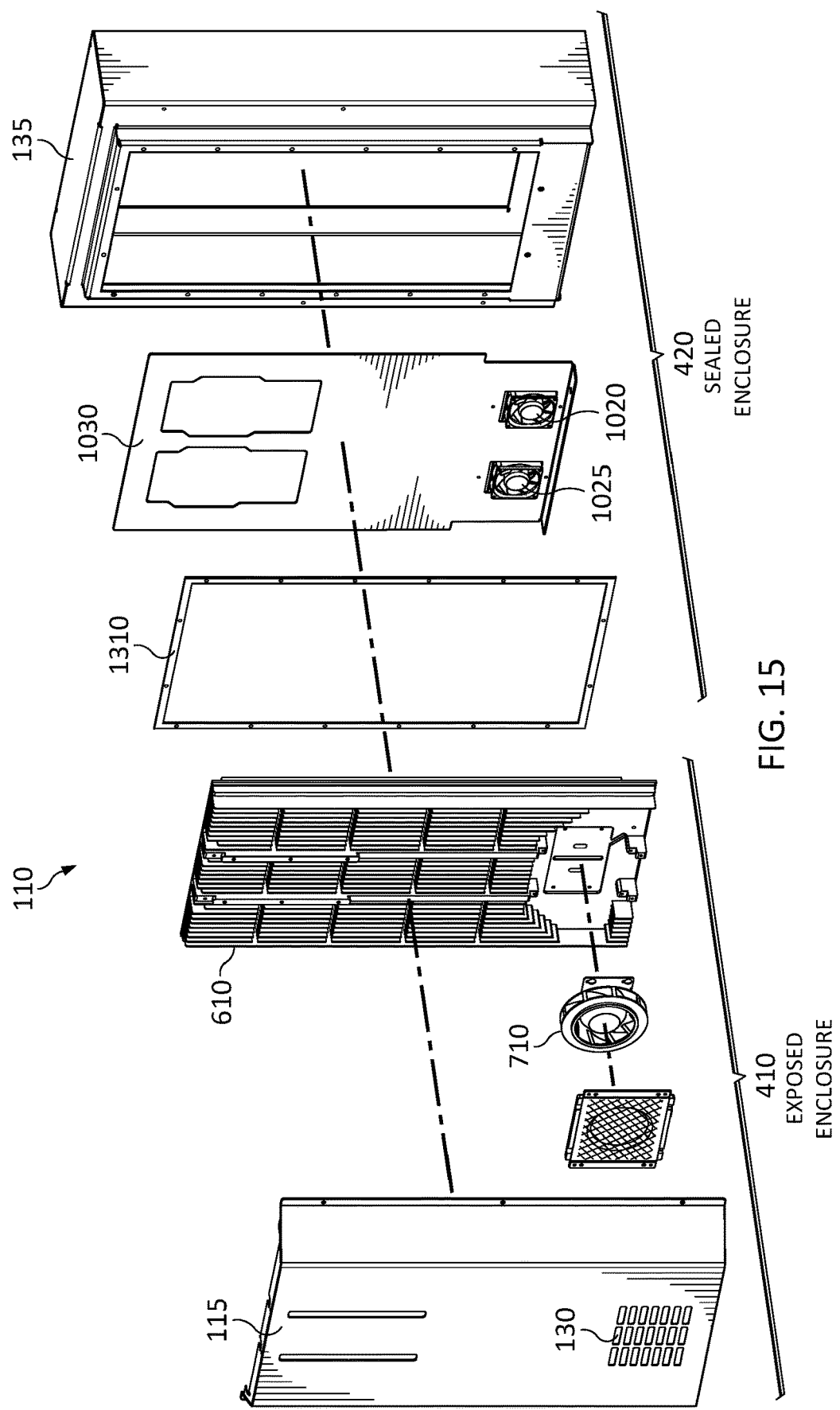
FIG. 15 shows an exploded view of the EVSE that includes a thermal management system according to an embodiment.
Figure 16:
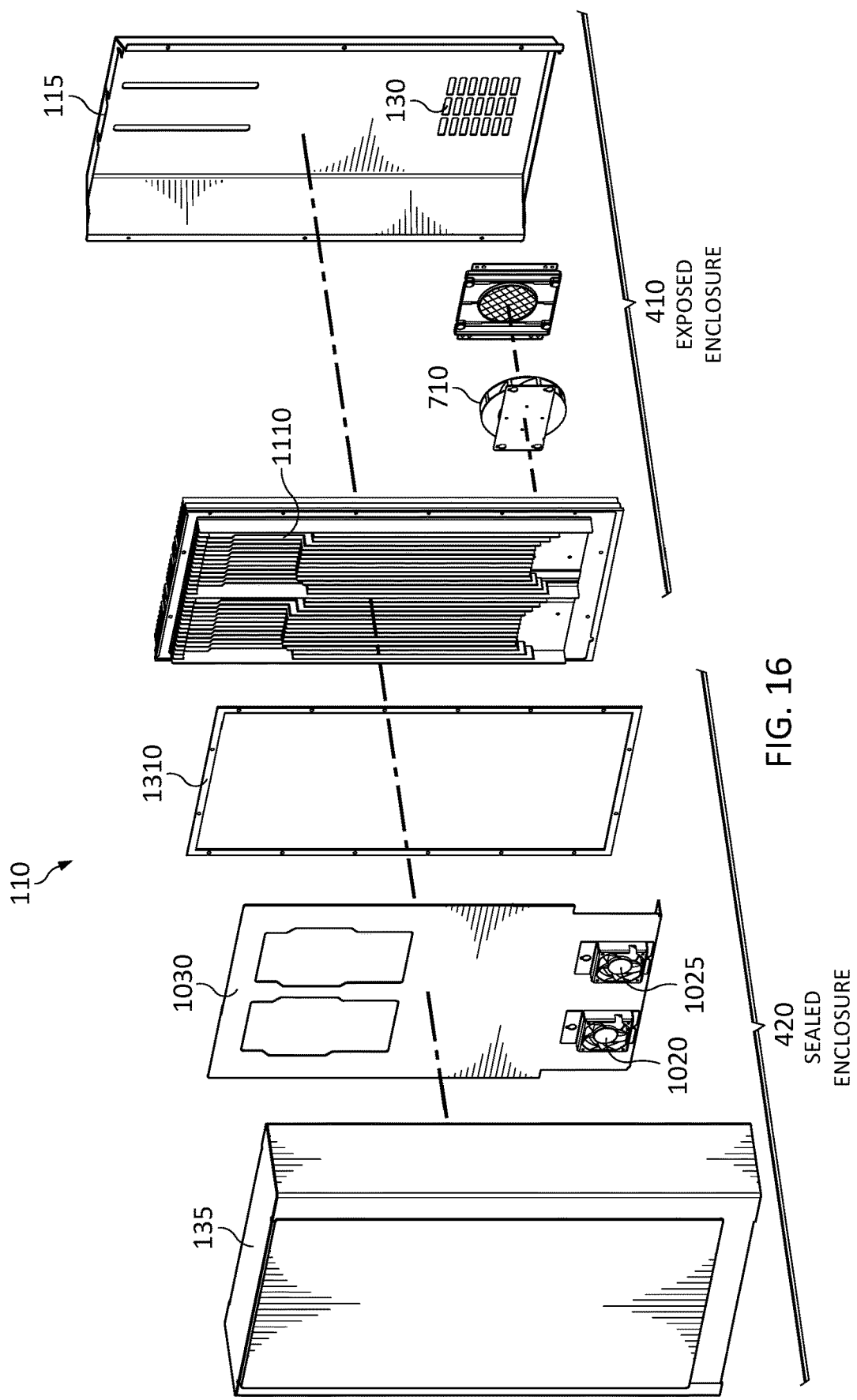
FIG. 16 shows another exploded view of the EVSE that includes a thermal management system according to an embodiment.

FIG. 15 shows an exploded view of the thermal management system according to an embodiment and FIG. 16 shows another exploded view of the same.

In an embodiment, the internal fans 1020 and 1025 and the external fan 710 do not operate constantly if charging is not ongoing or otherwise not in a cooling down scenario. That is, in such an embodiment, these fans only operate when charging is ongoing and during a cool down condition of the EVSE such as after a charging session has ended.

Figure 17:
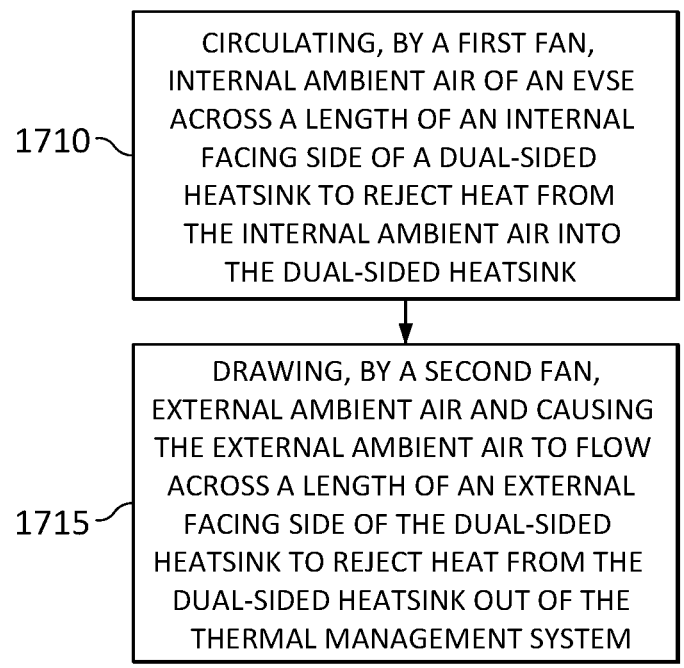
FIG. 17 is a flow diagram that illustrates exemplary operations for a thermal management system for an EVSE according to an embodiment.

FIG. 17 is a flow diagram that illustrates exemplary operations for a thermal management system for an EVSE according to an embodiment. The operations of FIG. 17 are described with respect to the exemplary embodiments of the diagrams. However, the operations of FIG. 17 can be performed by embodiments different from that of the other diagrams, and the embodiments shown in the other diagrams may perform operations different from that of FIG. 17.

At operation 1710, a first fan (e.g., the internal fans 1020 and 1025) circulate internal ambient air of the EVSE across a length of an internal facing side of a dual-sided heatsink (e.g., the second side 1110 of the dual-sided heatsink 605) to reject heat from the internal ambient air into the dual-sided heatsink. The first fan is included in a sealed enclosure 420 of the EVSE. The sealed enclosure 420 also includes heat generating electrical components and other electrical components such as contactors or relays, safety features, processors, etc. the electrical components are not directly connected to the dual-sided heatsink. The sealed enclosure 420 is sealed to the environment with an Ingress Protection (IP) rating, such as IP 56. The first fan may be an axial fan or other type of fan. An internal backplate 1030, which is a mounting point for the first fan, guides the internal ambient air from bottom towards the top of the internal facing side of the dual-sided heatsink.

Next, at operation 1715, a second fan (e.g., the external fan 710) draws external ambient and causes the external ambient air to flow across a length of an external facing side of the dual-sided heatsink to reject heat from the dual-sided heatsink out of the thermal management system. The second fan is included in an exposed enclosure 410 of the EVSE. A cover (e.g., the external facing cover 115) guides the external ambient air out of the exposed enclosure 410.

Thus, the first fan rejects heat from the internal ambient air of the sealed enclosure of the EVSE into the dual-sided heatsink. The second fan blows external ambient air across the dual-sided heatsink to reject heat from the dual-sided heatsink into the environment. The airflow seal prevents the external ambient air and the internal ambient air from mixing, which ensures a low pollution degree and no need for dust filtration. The thermal management system described has greater thermal performance than a single sided free convection heatsink, while avoiding the pollution degree and filtration issues encountered with fresh air intake. Fresh air intake with a filtration system might require scheduled maintenance annually, whereas the thermal management system described herein can go many years without scheduled maintenance. The lower pollution degree decreases the requirements for creepage and clearance between electrical components which can reduce the size and cost of PCBAs.

Figure 18:
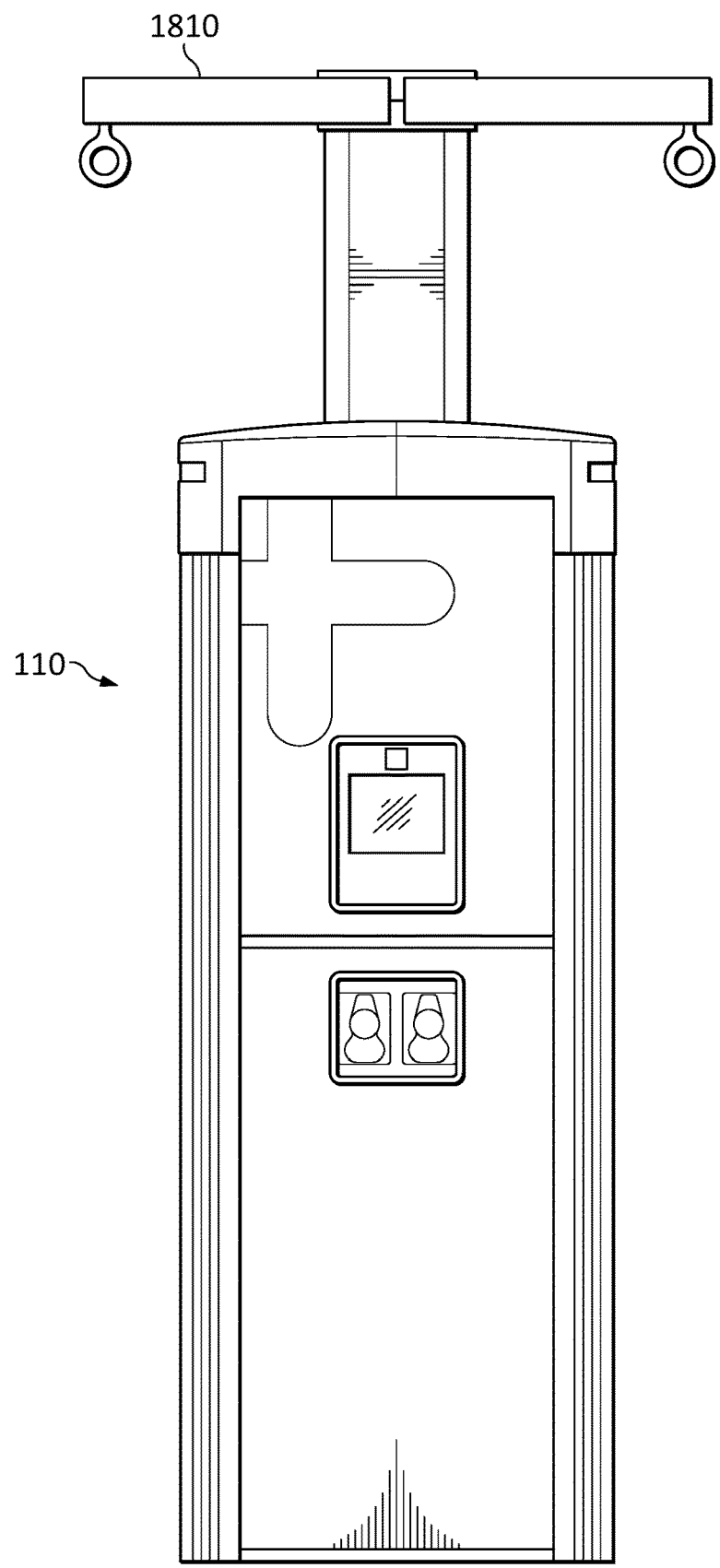
FIG. 18 illustrates a first view of an exemplary EVSE that includes a thermal management system according to an embodiment.
Figure 19:
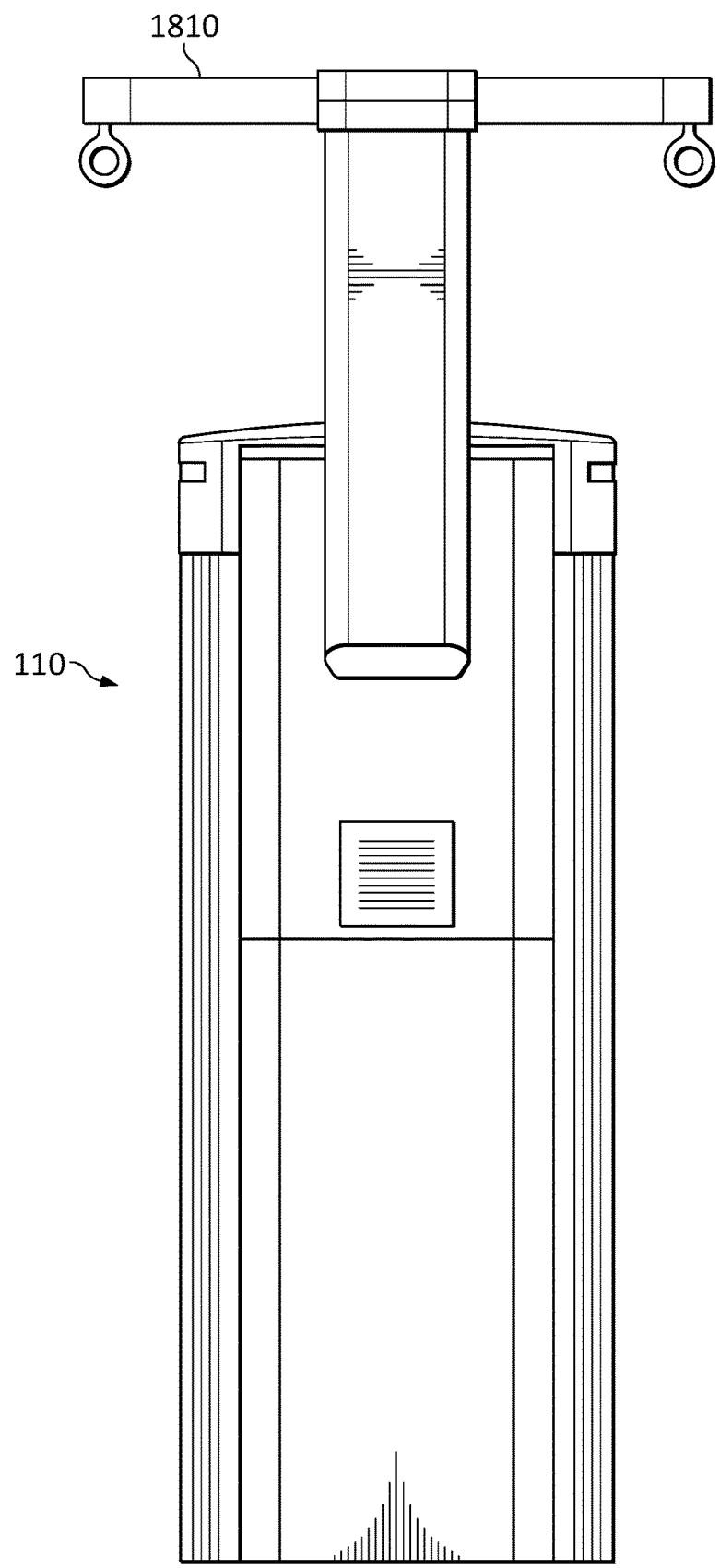
FIG. 19 illustrates a second view of the EVSE shown in FIG. 18 according to an embodiment.

As an example, the thermal management system described herein may allow for 500 A charging simultaneously to two vehicles. FIG. 18 illustrates a first view of an exemplary EVSE 1810 that includes a thermal management system in accordance with an embodiment described herein; and FIG. 19 illustrates a second view of the EVSE 1810. In this example, the attachment ribs 120 and 125 are used for attaching a cable management solution (the cables are not shown in the Figures).

Although an embodiment has been described where the external airflow exits the top of the thermal management system 110 (e.g., through the top cover 310), in another embodiment the external airflow exit may be on the side of the EVSE such as the side of the external facing cover 115 (e.g., towards the top of the external facing cover 115).

In the preceding description, numerous specific details are set forth to provide a more thorough understanding. It will be appreciated, however, by one skilled in the art that the embodiments may be practiced without such specific details. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the preceding description and the claims, the terms "coupled" and "connected," along with their derivatives, may be used. These terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

While the flow diagrams in the figures show a particular order of operations performed by certain embodiments of the invention, such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. An electric vehicle supply equipment (EVSE) that includes a thermal management system, comprising:
   a dual-sided heatsink, including:
      a first side that faces internal ambient air of the EVSE, wherein the internal ambient air of the EVSE is heated by electronic components of the EVSE, and wherein no electronic components of the EVSE are directly connected to the dual-sided heatsink, and
      a second side that faces external ambient air;
   a first fan that circulates the internal ambient air of the EVSE across a length of the first side of the dual-sided heatsink to reject heat from the internal ambient air into the first side of the dual-sided heatsink that in turn conducts to the second side of the dual-sided heatsink;
   a first airflow guide that guides the internal ambient air across the length of the first side of the dual-sided heatsink;
   a second fan that draws external ambient air that flows across a length of the second side of the dual-sided heatsink to reject heat from the second side of the dual-sided heatsink out of the thermal management system, wherein heat from the second side of the dual-sided heatsink conducts to the external ambient air;
   a second airflow guide that guides external ambient air across the length of the second side of the dual-sided heatsink; and
   an airflow seal that prevents the external ambient air and the internal ambient air from mixing.

2. The EVSE of claim 1, wherein the first side and the second side of the dual-sided heatsink have a finned structure.

3. The EVSE of claim 1, wherein the first fan is an axial fan.

4. The EVSE of claim 1, wherein the second fan is a centrifugal fan.

5. The EVSE of claim 1, wherein the first fan is located proximate to a bottom third of the first side of the dual-sided heatsink, and wherein the second fan is located proximate to a bottom third of the second side of the dual-sided heatsink.

6. The EVSE of claim 1, wherein the second side of the dual-sided heatsink has a plurality of fin structures in a grid.

7. The EVSE of claim 1, further comprising:
   a top cover that has a hole mesh pattern that allows the external ambient air to escape out the top cover and prevents debris larger than holes of the mesh pattern to enter the second side of the dual-sided heatsink.

8. The EVSE of claim 1, wherein the airflow seal is a compressible material.

9. The EVSE of claim 1, wherein the first airflow guide is an internal backplate to which the first fan is mounted.

10. The EVSE of claim 1, wherein the second airflow guide is a cover that covers the first side of the dual-sided heatsink.

11. A method for a thermal management system for an electric vehicle supply equipment (EVSE), the method comprising:
   circulating, by a first fan, internal ambient air of the EVSE across a length of an internal facing side of a dual-sided heatsink of the thermal management system to reject heat from the internal ambient air into the internal facing side of the dual-sided heatsink that in turn conducts to an external facing side of the dual-sided heatsink;
   drawing, by a second fan, external ambient air and causing the external ambient air to flow across a length of the external facing side of the dual-sided heatsink to reject heat from the external facing side of the dual-sided heatsink out of the thermal management system, wherein heat from the external facing side of the dual-sided heatsink conducts to the external ambient air;

wherein an airflow seal prevents the external ambient air and the internal ambient air to mix; and wherein no electronic components of the EVSE are directly connected to the dual-sided heatsink.

12. The method of claim 11, wherein the internal facing side and the external facing side of the dual-sided heatsink have a finned structure.

13. The method of claim 11, wherein the first fan is an axial fan.

14. The method of claim 11, wherein the second fan is a centrifugal fan.

15. The method of claim 11, wherein the first fan is located proximate to a bottom third of the internal facing side of the dual-sided heatsink, and wherein the second fan is located proximate to a bottom third of the external facing side of the dual-sided heatsink.

16. The method of claim 11, wherein the external facing side of the dual-sided heatsink has a plurality of fin structures in a grid.

17. The method of claim 11, wherein the airflow seal is a compressible material.

18. The method of claim 11, wherein the heat from the dual-sided heatsink is rejected out of the thermal management system through a top cover that has a mesh pattern that allows external ambient air to escape and prevents debris from entering the external facing side of the dual-sided heatsink that are larger than holes of the mesh pattern.

19. The method of claim 11, wherein the first fan is mounted to an internal backplate that also guides the internal ambient air across the length of the internal facing side of the dual-sided heatsink.

20. The method of claim 11, wherein the second fan is a cover that covers the external facing side of the dual-sided heatsink and guides the external ambient air across the length of the external facing side of the dual-sided heatsink.

* * * * *